H. DUMARS.
PLANT FOR THE HANDLING AND UTILIZATION OF LIQUID AIR AND THE LIKE.
APPLICATION FILED MAR. 28, 1904.
954,268.
Patented Apr. 5, 1910.
2 SHEETS—SHEET 1.
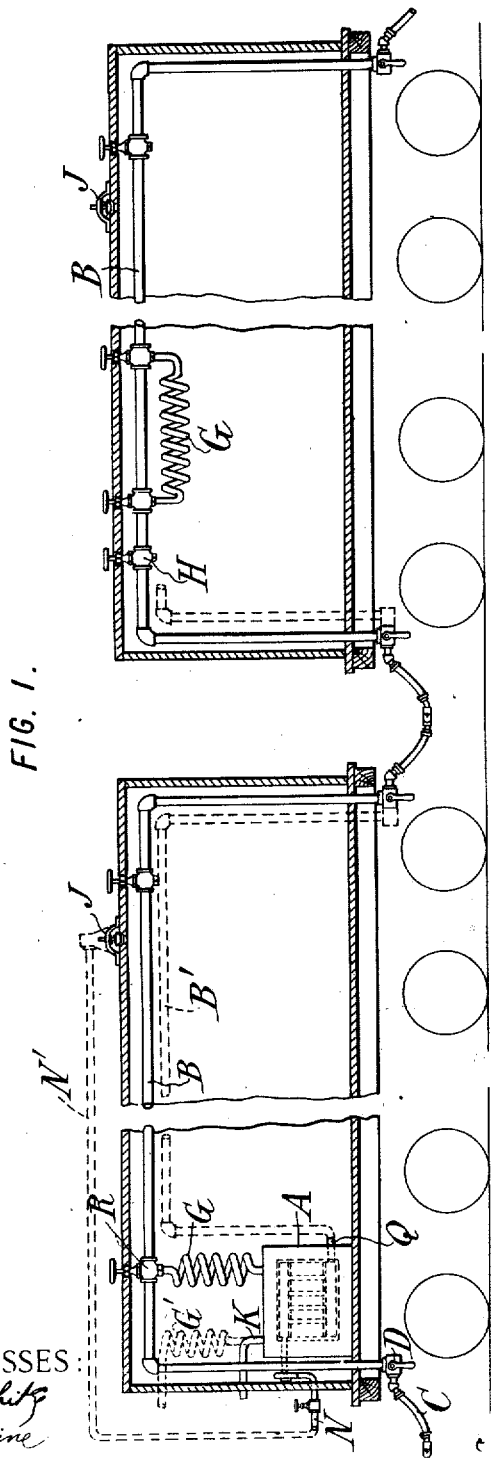
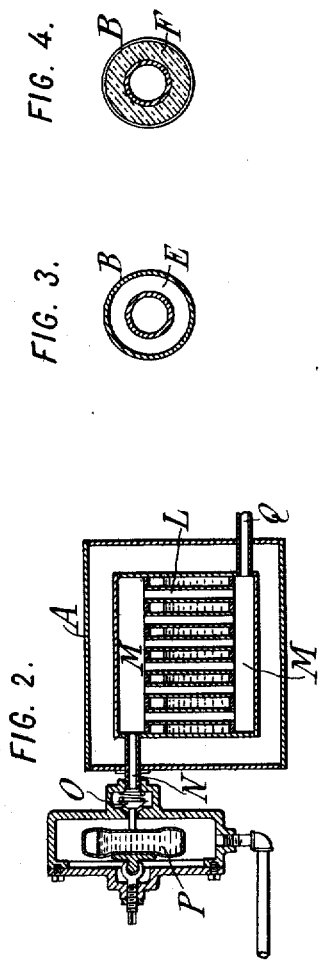
WITNESSES:
INVENTOR:
Horace Dumars,
By Attorneys, H. DUMARS.
PLANT FOR THE HANDLING AND UTILIZATION OF LIQUID AIR AND THE LIKE.
APPLICATION FILED MAR. 28, 1904.
954,268.
Patented Apr. 5, 1910.
2 SHEETS—SHEET 2.
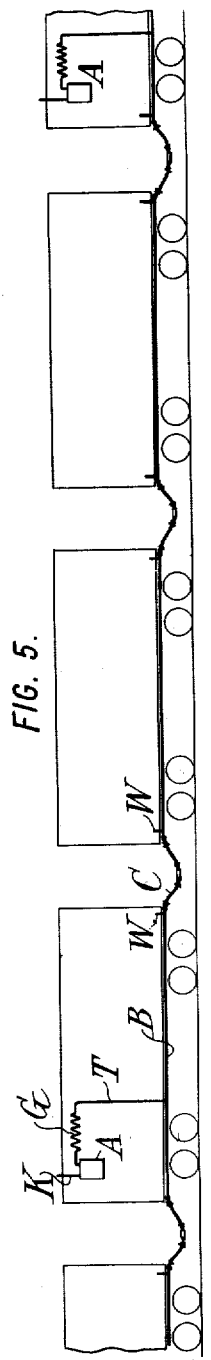
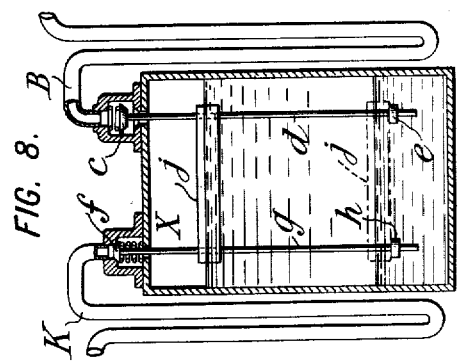
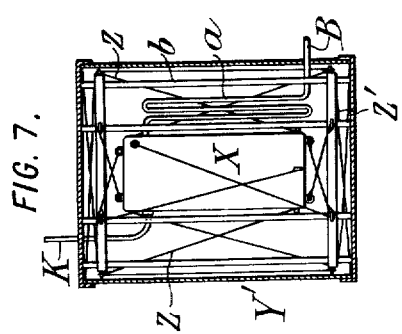
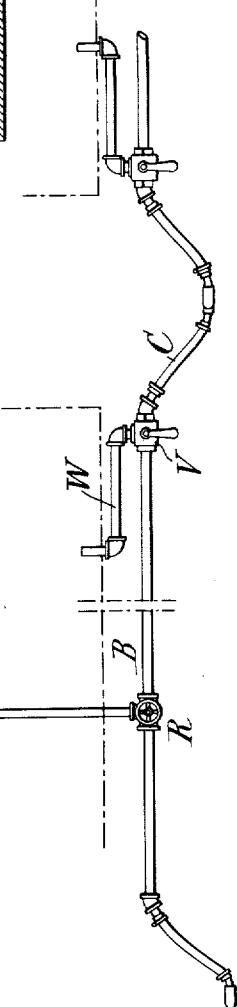
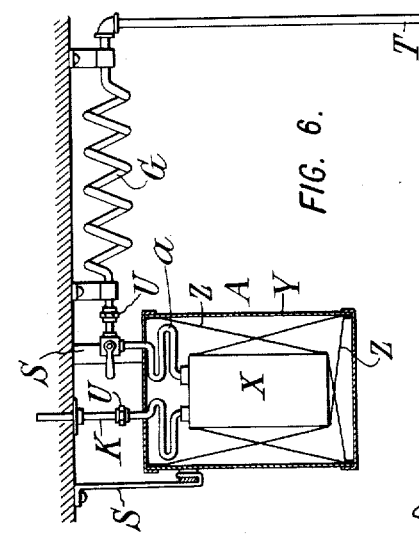
WITNESSES:
Fred White
René Mine
INVENTOR:
Horace Dumars,
By Attorneys,
Arthur E. Mason & Co.

UNITED STATES PATENT OFFICE.

HORACE DUMARS, OF GLEN RIDGE, NEW JERSEY.

PLANT FOR THE HANDLING AND UTILIZATION OF LIQUID AIR AND THE LIKE.

954,268.　　　　　　　Specification of Letters Patent.　　Patented Apr. 5, 1910.

Application filed March 28, 1904. Serial No. 200,320.

*To all whom it may concern:*

Be it known that I, HORACE DUMARS, a citizen of the United States, residing at Glen Ridge, in the county of Essex and State of New Jersey, have invented certain new and useful Improvements in Plants for the Handling and Utilization of Liquid Air or the Like, of which the following is a specification.

This invention provides efficient means for utilizing liquid air as a refrigerant in the preservation of fruits or vegetables or the like, as a means for obtaining valuable gases, and for other purposes referred to in detail hereinafter. For most of the purposes of my invention, other gaseous substances than liquid air may be liquefied and utilized with substantially equivalent effect, and the invention in its broadest sense includes apparatus for use with such other gases.

According to one feature of my apparatus, and which applies necessarily only to gaseous substances including nitrogen, the liquid air is evaporated through a radiator, and then the nitrogen (which is first evaporated from the air) is discharged into a compartment containing goods to be preserved. The nitrogen acts by exclusion of oxygen or atmospheric air, to retard or prevent decay of fruits or vegetables or meats. It is also a safe medium in which to store explosives or goods subject to spontaneous combustion, or it may be stored in a tank and released by automatic means into a compartment for the purpose of extinguishing fire therein or as a drying medium. Preferably the compartment into which the nitrogen is discharged is closed, and the pressure of the evaporating liquid fills the compartment with nitrogen, creating a pressure therein in excess of atmospheric, and thus excluding atmospheric air. The compartment may be provided with a safety valve, which can be set at any pressure which it is desired to maintain in the compartment. When the nitrogen is entirely evaporated into the preserving or storage compartment, the remaining liquid oxygen may be evaporated through a separate conduit to a point outside of the nitrogen compartment, and if convenient into another compartment, where it can be stored and used in various ways.

This system is of great value in fruit cars or trains, and one feature of the invention is the provision of a plant for such cars or trains, including a train-pipe extending from end to end of each car, coupling at opposite ends with similar pipes on adjacent cars, and carrying one or more radiators or discharge openings for the nitrogen, or both, so as to utilize both the cooling and the oxygen-excluding properties of the evaporating liquid air. As the liquid air is approximately four-fifths nitrogen, it will be seen that it provides a very valuable preserving medium. Means are provided, preferably automatic, for discharging the evaporating oxygen outside of the car, preferably utilizing its cooling effect before discharging it.

By means of a special apparatus forming another feature of the invention, it is possible to vary very quickly the cooling effect obtained from a vessel of liquid air, and in its preferred form this mechanism automatically brings the temperature down to a desired point and maintains it there. The principal features of such a mechanism are a means for passing gas or air through the liquid air container so as to cool the gas or air (which may be then discharged into the compartment), and at the same time to hasten the evaporation of the liquid air. By regulating the admission of gas or atmospheric air by a thermostat or similar device, an apparatus is obtained which responds very quickly and sensitively to changes of temperature within the compartment.

Another feature of the invention is the provision of a special vessel or container in which liquid air may be stored or transported either for the uses above described or for any other use, with a minimum rapidity of evaporation. According to this invention the container consists of an inner vessel in which is the liquid air, and an outer vessel forming a space around the inner one, in which space there is a vacuum; the inner vessel being supported within the outer by a special means which provides a minimum conduction of heat to the inner vessel.

Various other improvements in detail are referred to hereinafter.

The accompanying drawings illustrate certain embodiments of the invention.

Figure 1 represents two cars of a fruit train in longitudinal section, the figure being largely diagrammatic; Fig. 2 is a section of the container and automatic regulator of the plant shown in Fig. 1; Figs. 3 and 4 are cross-sections of suitable pipes; Fig. 5 is a diagrammatic view of another fruit train system; Fig. 6 is an enlargement of portions of Fig. 5; Figs. 7 and 8 are sections of different styles of liquid air containers.

Referring now to the embodiments illustrated, and especially to Figs. 1 and 2, A is the container and B the train-pipe which preferably extends throughout its length within the car, and which carries at the opposite ends of the car coupling sections C and valves D for closing the end of the pipe of the rear car of a train. Preferably each car carries a radiator and an outlet for nitrogen, with a valve for controlling each of these elements. The container may be of a capacity sufficient to supply only one car (each car having its own container, in which case of course the couplings are unnecessary), or it may supply any number of cars, such as the three shown in Fig. 5, or one container may be of sufficient size for an entire train, as for example by using one car solely for carrying the container in long trains. These matters will depend upon the distance which the train has to travel, the season of the year, and various other considerations. Preferably the train-pipe B is insulated, as by surrounding it with a vacuum chamber E (Fig. 3), or with mineral wool or felt or the like F (Fig. 4). The radiators G are preferably in the form of uninsulated metal coils. They may be arranged as shown in the left hand car of Fig. 1, that is to say, in the direct line of the cooling current, so that all of the gas passes through them, or they may be arranged as in the right hand car in a by-pass of the train-pipe B, with a valve at each end which regulates the portion of the gas passing through the radiator. H are valved outlets of which one or more may be provided in each car for regulating the admission of nitrogen into the car. These cars are ordinarily closed as tightly as possible and sealed, and when the car is once filled with nitrogen at a pressure slightly above the atmosphere, it will remain substantially in this condition for a long time. A safety valve J is provided to prevent too great a pressure within the car. The train-pipe B preferably runs along near the roof of the car, so that the cold which it emits will pass downward through the goods, causing a circulation of the warmed air arising after contact with the goods. This arrangement is also convenient in permitting the extension of the valve stems through the roof of the car, where they are easily accessible from the outside. This is necessary because it is customary to seal the car doors from the beginning to the end of their journey. By arranging the pipe near the top of the car also, the floor space is unobstructed. K is the oxygen pipe, which may pass directly from the container to the outside air, suitable automatic mechanism being provided within the container as hereinafter described. The oxygen may if desired pass first through a coil, indicated in dotted lines at G', before being discharged to the atmosphere.

As illustrated in Fig. 2, the inner vessel of the container may carry a number of tubes L passing through the liquid air and connecting with end spaces M, with the upper one of which is connected a pipe N connecting with the atmosphere through a valve O controlled by the expansible element P of any suitable form of thermostat. As the rapidity of evaporation of the liquid air becomes insufficient to make up for the leakage, the temperature of the car or other compartment rises, the member P of the thermostat is expended and opens the valve O, which admits air to the pipe N and the chamber M, whence it passes down through the tubes L, being circulated by the downward tendency of it as it cools, and out into the car by the pipe Q. At the same time it heats the liquid air and in proportion to the quantity of atmospheric air passing through, causes an increased rapidity of evaporation, which without varying the position of the valves controlling the radiators and the nitrogen outlets, increases the pressure in the train-pipe, and therefore the cooling effect of the radiators and the quantity of nitrogen discharged through the outlets. When the temperature has been reduced to the desired point for which the thermostat is set, the valve O closes, and there is no further admission of cooled atmospheric air, and rapidity of the evaporation of the liquid air is reduced to substantially the point required to make up for gradual leakage. With the system shown in Fig. 1 the cooling and preserving supply for the entire train may be cut off by closing the valve R, which admits the evaporated air to the train-pipe, the pipe N being also closed at its outer end by the hand valve shown. It is understood in all cases that the container is provided with the usual safety valve to prevent its bursting from the accumulation of internal pressure.

The relative positions and details of the plant shown in Fig. 1 are not essential to the invention in its broadest aspect.

Figs. 5 and 6 show a liquid air container A arranged to supply three cars of a train, a small container being suspended by hooks S from the roof of the car, and the train-pipe B being arranged underneath the car, so that except for the container and the radiator, the inner space of the car is entirely clear and available for fruit. Of course the system can be used for cooling passenger cars, with very slight modifications. The invention is not limited in its broadest aspect to fruit cars, or indeed to cars of any sort, being easily adapted to stationary compartments for various purposes. The downward connection T carries the current to a valve R, whence the current passes to the train-pipe B. The closing of the valve R cuts off the supply from the entire section. The oxygen pipe K leads directly out through the roof of the car. Union couplings U serve to disconnect the container A from the system so as to permit its removal when empty and its ready replacement by a new full container. The valves V at the end of each car may be three-way valves, serving not only to close the end of the train-pipe, but to admit nitrogen to the branches W passing upward into the cars. In this plant it is proposed to use only the nitrogen in cars having no container, and to use either a radiator alone or a radiator in connection with a nitrogen outlet in the car carrying the container. Although the train may be divided into sections corresponding to the number of cars fed by each container, yet it is preferred to couple the train-pipe together throughout the train, and to have all the intermediate end valves open, so that all the containers discharge into a common train-pipe and a uniform pressure is maintained throughout.

In order that the system shall be commercially practicable, it is important to provide a container which may be transported or kept for some time without use, and without in the meantime losing a great part of its contents by evaporation, and which furthermore shall be strong enough to stand rather severe handling. An important feature of this invention is the provision of such a container adapted for use in connection with the systems described, and adapted of course for various other uses, such as the shipping of liquid air generally. The principal point of importance in the container is in the manner of supporting the inner vessel within the outer vessel. Formerly the usual way has been to support the inner vessel by its neck within the outer vessel. This manner of support, however, requires a very strong and heavy connection at the neck, in order to prevent lateral movement of the inner vessel and to resist the transverse strains at the connection, and necessarily provides a path of considerable cross-section along which heat from the outside may be conducted to the inner vessel. By providing connecting or supporting members which connect various points of the inner vessel with the outer, and preferably by arranging these connections in a sort of truss, I secure a great rigidity of the inner vessel within the outer with a minimum cross-section of metal through which heat may be conducted from the outside. The connecting members being subjected to no bending strains, that is to say, being subjected only to direct tension or compression, do not have to be of very great cross-section.

Referring now to what is perhaps the simplest example, shown in Fig. 6, the container, which I designate as a whole in all cases by the letter A, consists of an inner vessel X surrounded by an outer vessel Y, a vacuum being maintained or provided in the space between the two vessels. Instead of the stiff and large connection between the outer vessel and the neck of the inner vessel which is ordinarily provided, I substitute a sort of trussed connection consisting of tension wires Z pulling the inner vessel in opposite directions, and so counterbalancing each other and holding the inner vessel rigidly in place. The members Z may be of very fine wire, and they may be extended from one end of the outer vessel entirely to the opposite end of the inner vessel, as shown, so as to provide a very long path of conduction. Similarly to oppose as far as possible the conduction of heat to the inner vessel, the tube or tubes which carry the vapors outward therefrom, are extended back and forth within the insulating space to form "coils" $a$, thus providing a very long path for the heat. The idea may be extended by the interposition of a frame of non-conducting material such as wood between the inner and outer vessels. For example in Fig. 7 a wooden frame $b$ carries within it the inner vessel X, and is connected thereto by wire ties or braces Z similar to those already described. The wooden frame $b$ is rigidly connected to the outer vessel Y by means of a similar set of long metal struts or ties Z'. Here any heat which is to be conducted to the inner vessel must first pass the length of the members Z', must then be transmitted through a portion of the wooden frame $b$, and must again pass through the wires Z before reaching the inner vessel. One or more coils $a$ may be provided in this case also.

Fig. 8 shows a specific construction of the inner vessel which may be used in the systems above described, and by means of which the nitrogen is first evaporated into one conduit and the oxygen subsequently evaporated into another, the change being accomplished automatically. In this case the valve for releasing the nitrogen (which serves also as the necessary safety valve during transportation of the container) is indicated at $c$, being spring pressed to its seat, and being provided with a long stem $d$, with a nut $e$ adjustably located near the lower end. The oxygen valve $f$ opens in the opposite direction, and is provided with a similar stem $g$ and nut $h$. A float $j$ is apertured and slides up and down on the two valve stems $d$ and $g$. The pressure within the vessel X is depended upon to open the valve $c$ and expel the nitrogen under pressure into the train-pipe or other conduit in which it is to be used. The figure shows the position of the float $j$ in full lines when the vessel is substantially full of liquid air, When about four-fifths of the liquid air, that is to say all the nitrogen therein, has been evaporated, the float falls to the position indicated in dotted lines, and bears on the two nuts $e$ and $h$. The weight of the float is sufficient to open the valve $f$, and at the same time to close the valve $c$, so that the remaining gases evaporated, principally oxygen, pass outward through the oxygen pipe K while the nitrogen pipe B is closed. The inner vessel X of this figure is carried in any suitable outer vessel, or is protected against the heat of the outer air in any suitable manner. It is understood in fact that each of the containers herein shown may be provided in addition to the outer vessel shown, with a surrounding non-conducting vessel of wood or packing material of any sort. It is to be understood also that the separate outlet K for oxygen is not essential. The oxygen in many cases can be used in the same pipe as the nitrogen. Or where this is not desirable, the float may be arranged to close the nitrogen valve and to retain the oxygen within the vessel under pressure, no outlet being provided for the oxygen.

Instead of admitting atmospheric air through the pipe N, Figs. 1 and 2, I may admit specially dried air in stationary plants or wherever else it may be convenient. This avoids any danger of accumulation of frost within the tubes L by reason of the moisture in the atmosphere. In railway cars for example I may use the nitrogen which escapes from the car, this being necessarily dried thoroughly in the manufacture of liquid air. I show in Fig. 1 in dotted lines a line N' for this purpose. The cooled nitrogen passing out through Q in such case would be discharged outside of the car. Its cooling effect might be utilized by any suitable radiating pipes, as by a naked pipe B' running through the train and open at its rear end. Or atmospheric air may be forced through the container, as by means of pumps driven from the car axle.

By connecting the pipes B and K to opposite sides of the inner vessel X as in Fig. 7 the liquid oxygen may be run off at any time by simply turning the container on its side, air being admitted from the upper pipe and the liquid flowing out of the lower. Any other suitable arrangement of pipe and valve may be used where it is desired to draw off the oxygen as a liquid. For example a long straight tube may pass from the inner vessel to the outside of the outer vessel with a valve at its inner end controlled by a handle or the like at its outer end.

I do not in the present application claim the process above described, and I do not claim specifically certain of the apparatus, but it is not to be understood from my failure to claim such matters in this application that I waive my right to claim them in a separate application or applications.

Though I have described with great particularity of detail certain embodiments of the invention, yet it is not to be understood therefrom that the invention is limited to the particular embodiments disclosed. Various modifications of the apparatus in detail, and in the arrangement and combination of the several elements, may be made by those skilled in the art, without departure from the invention.

What I claim is:—

1. A plant for refrigerating and preserving and similar purposes, comprising in combination a closed compartment, an insulated container A for liquid air, an insulated conduit B through which evaporation takes place, and an uninsulated radiator G in a by-pass of said conduit and having a hand valve at each end to regulate the portion of the gas in said conduit which may pass through said radiator, the handles of said valves lying outside of said compartment.

2. A plant for utilizing liquid air, comprising a closed compartment, an insulated container for liquid air within said compartment, means for passing ordinary air through said container to cause evaporation of the liquid air therein, a thermostat controlling the passage of ordinary air, and a conduit into which evaporation takes place and which has a discharge opening into said closed compartment.

3. A plant for utilizing liquid air, comprising a closed compartment, an insulated container for liquid air within said compartment, means for passing ordinary air through said container to evaporate the liquid air therein, an uninsulated radiator communicating with the liquid air container, a thermostat controlling the passage of ordinary air, and an insulated conduit into which evaporation takes place and which has a discharge opening into said closed compartment.

4. A plant for utilizing liquid air comprising a container for the liquid air, means for passing ordinary air through said container, a radiator communicating with the liquid, and a thermostat controlling the passage of ordinary air, and a compartment in which said radiator and the discharge orifice for the ordinary air and said thermostat are located, whereby the temperature in said compartment may be quickly brought down to a desired point and automatically maintained there.

In witness whereof, I have hereunto signed my name in the presence of two subscribing witnesses.

HORACE DUMARS.

Witnesses:
DOMINGO A. USINA,
THEODORE T. SNELL.